United States Patent [19]

Shiratsuchi et al.

[11] Patent Number: 4,484,652
[45] Date of Patent: Nov. 27, 1984

[54] SUSPENSION SYSTEM

[75] Inventors: Kouji Shiratsuchi, Saitama; Yoshimi Ishikawa, Tokyo, both of Japan

[73] Assignee: Honda Giken Kogyo Kabushiki Kaisha, Tokyo, Japan

[21] Appl. No.: 412,505

[22] Filed: Aug. 30, 1982

[30] Foreign Application Priority Data

Sep. 4, 1981 [JP] Japan ............................ 56-138611
Sep. 4, 1981 [JP] Japan ............................ 56-138610

[51] Int. Cl.$^3$ ............................................ B62K 25/20
[52] U.S. Cl. .................................. 180/227; 280/284
[58] Field of Search ................ 180/219, 227; 280/284

[56] References Cited

U.S. PATENT DOCUMENTS 4,058,181 11/1977 Buell .................................. 180/227
4,076,271 2/1978 Doncque .......................... 280/284
4,360,214 11/1982 Isono .................................. 280/284
4,415,057 11/1983 Yamaguchi ...................... 180/227

FOREIGN PATENT DOCUMENTS 504447 4/1939 United Kingdom ............... 180/227

Primary Examiner—David M. Mitchell
Assistant Examiner—Kenneth R. Rice
Attorney, Agent, or Firm—Lyon & Lyon

[57] ABSTRACT

A motorcycle frame and suspension system employing a backbone frame member extending rearwardly over an engine and then downwardly where it is associated with an inverted U-shaped center frame. Two pivot mechanisms for a rear fork are positioned in line with the ends of the inverted U-shape center frame and a cushion member is located therebetween. The cushion member is linked at its first end with the middle of the center frame and at its second end to a linkage mechanism fixed to move with the upward pivotal motion of the rear fork. The mechanism is so proportioned as to provide an increasing rate of upward motion to the cushion member as the rear fork moves upwardly. The two pivot mechanisms are not identical, one allowing axial sliding movement and the other not allowing such movement.

6 Claims, 3 Drawing Figures

SUSPENSION SYSTEM

BACKGROUND OF THE INVENTION

The scope of the present invention is suspension systems for motorcycles and powered tricycles and specifically for the rear wheel or wheels therefor.

Motorcycles and powered tricycles are designed today to be as compact and lightweight as practical in the face of many competing requirements. In the area of frame and suspension requirements, the location of cushion members such as spring and damping units has been the subject of a continuing effort at compromise and study. Efforts have been made to locate such cushioning members inwardly on the motorcycle in the area between the engine and the rear wheel. However, such devices have interfered with such essentional factors as fuel tank location, tank capacity, air cleaner and electrical accessory space and the like and have inevitably resulted in compromise in design. Furthermore, such inboard cushioning systems have generally required extension of the wheel base to accommodate all components including cushion members. Extension of the wheel base results in unwanted additional overall weight.

Additionally, difficulties have been experienced in the fabrication of suspension systems capable of withstanding the loads imposed and the number of cycles expected over the life of a motorcycle. Increased loading can be experienced in inboard cushioning systems because of the short moment arm distances through which the cushion member acts. As a result, careful alignment of the components and close tolerances have been required, particularly in the area of the pivot mechanism for a pivoted trailing rear fork system employing inboard cushioning mechanisms.

SUMMARY OF THE INVENTION

The present invention is directed to a suspension system for the rear of a motorcycle or powered tricycle which accommodates the location of a cushion member inboard on the motorcycle between the engine and rear wheel without effecting overall length and the space needed for other essential components. Additionally, the present invention contemplates a simplified pivot mechanism for pivotally mounting the rear fork. To this end, two pivot mechanism are employed which are spaced laterally apart on the motorcycle. Within the space created between the pivot mechanisms and between the specially configured rear fork a cushion member may be placed to resiliently mount and/or damp the rear suspension and rear wheel.

By the placement of the cushioning member between the two pivot mechanisms for the rear fork, the rear wheel may be moved forwardly nearer to the crankcase than in conventional designs. This allows the wheel base of the motorcycle to be shortened and the weight of the motorcycle reduced. Additionally, location of the cushion member centrally on the motorcycle eliminates the difficulty of threading the motorcycle drive chain around outboard cushion members. The low placement of the cushion member also avoids interference with the engine components and with the fuel tank. By avoiding obstruction of the motorcycle forward of the pivot axis of the rear fork, the crankcase and output shaft of the engine may be placed relatively near the pivot axis of the rear fork. Such placement of the rigid crankcase enhances the rigidity of the motorcycle frame adjacent to the rear suspension mounting. Further, the location of the output shaft as close as possible to the axis of the rear fork reduces the amount of chain slack necessary to accommodate pivotal motion of the rear suspension.

The employment of two pivot mechanisms increases the ability for adjustment and tolerance accommodation for the pivotal mounting of the rear fork. The increased effective width of the entire pivot system also reduces the load on the components and the need for more expensive assembly.

Thus, advantages in vehicle layout and construction are realized through employment of the present invention. Accordingly, it is a principal objection of the present invention to provide an improved rear wheel suspension system for a motorcycle or powered tricycle. Other and further objects and advantages will appear hereinafter.

DETAILED DESCRIPTION OF THE PREFERRED EMBODIMENT

Figure 1:
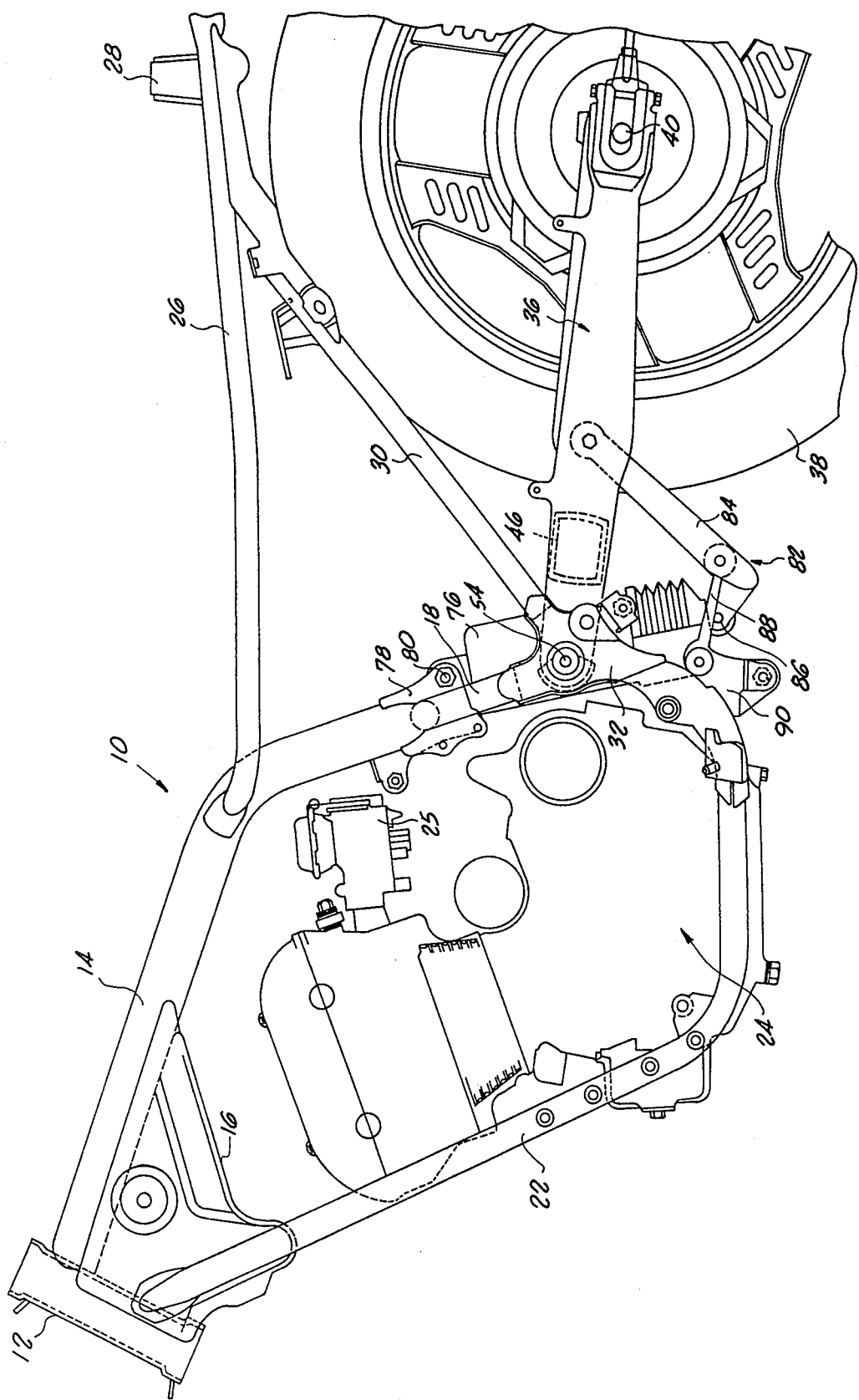
FIG. 1 is a side view of a motorcycle employing the present invention.

Turning in detail to the drawings, FIG. 1 illustrates a cradle type frame, generally designated 10, for a motorcycle. The frame is constructed to include a head pipe 12 in which is pivotally mounted the steering shaft of a front wheel, not shown. Extending rearwardly from the head pipe 12 is a backbone frame member 14. The backbone frame member 14 is made of a pipe having a relatively large diameter and is bent to form two segments. The first of the two segments extends rearwardly over the engine, schematically illustrated as 24, and the second of the two segments depends downwardly behind the engine 24 and the carburetors 25 as can best be seen in FIG. 1. Gusseting 16 gives added strength to the structure of the head pipe 12 and the backbone frame member 14.

Figure 3:
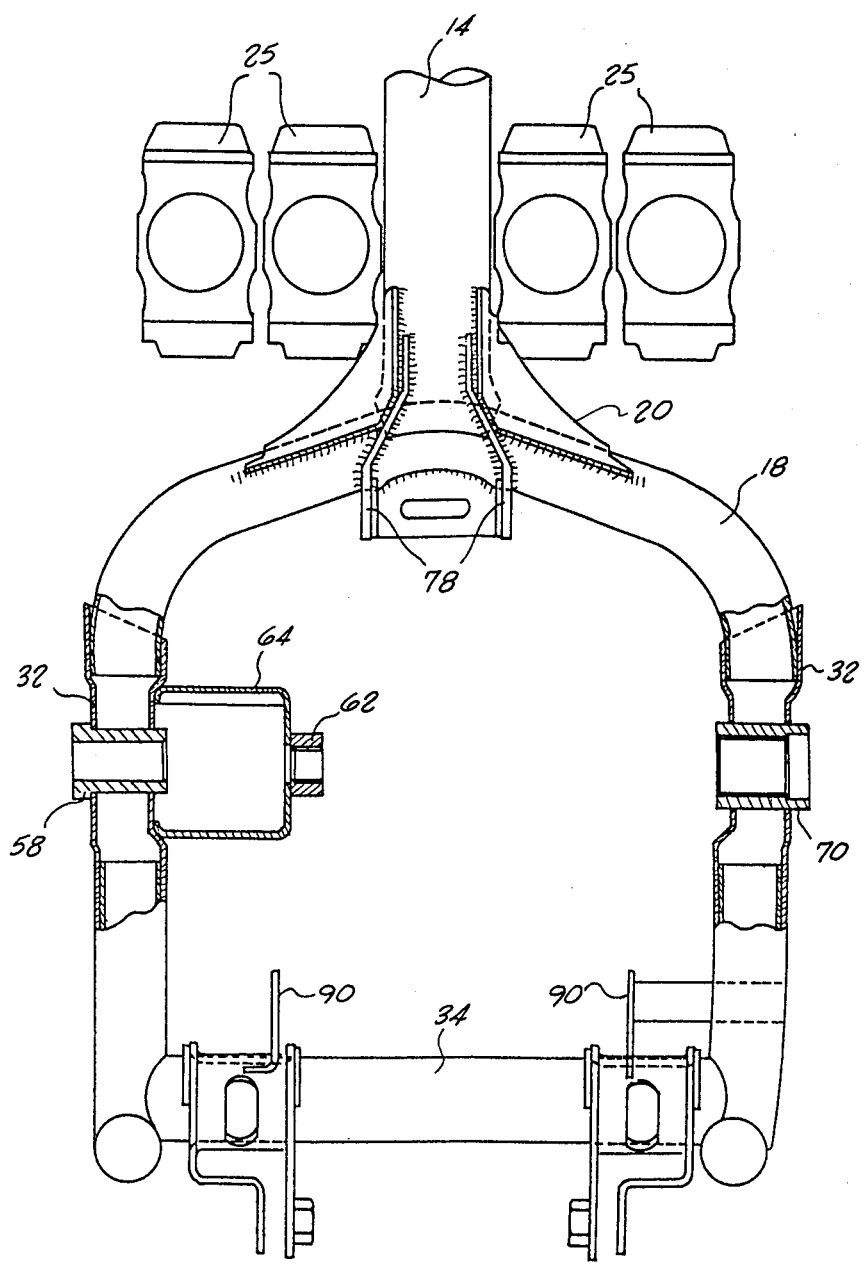
FIG. 3 is a view of the frame of a motorcycle embodying the present invention looking forward on the motorcycle of FIG. 1 from behind the pivot axis of the rear suspension.

A center frame 18 is rigidly fixed to the backbone frame member 14 at the back end thereof. This center frame 18 extends downwardly in alignment with the second segment of the backbone frame member 14 and is formed in an inverted U-shaped configuration. The joinder of the backbone frame member 14 and the center frame 18 may be seen both in FIG. 1 and in FIG. 3. Again, gussets 20 add strength to the joint.

Also extending rearwardly from the head pipe 12 is a pair of down tubes 22. These tubes extend downwardly and then rearwardly along the bottom sides of the engine 24.

Extending rearwardly from the backbone frame member 14 at approximately the junction between the two segments thereof are a pair of side rails 26. These side rails are supported by a cross member 28 and cooperate with two backstays 30 to form a rearwardly extending structure.

To tie the center frame 18, the down tubes 22 and the backstay 30 together, a pair of connecting bracket assemblies 32 are positioned immediately behind the crankcase of the engine 24. The connecting brackets 32 provide sockets for receipt of these various frame members and in doing so form two parallel junctions for the various frame components of the motorcycle. To provide adequate reinforcement and strength between these parallel frame junctions, a transverse frame member 34 extends between the lower ends of the connecting brackets 32. This transverse frame member 34 cooperates with the U-shaped center frame 18 in providing lateral support for the connecting brackets 32.

Also mounted to the connecting brackets 32 is a rear fork mechanism 36 which in turn supports a rear wheel assembly 38 about an axle 40. The rear fork mechanism 36 includes, as can best be seen in FIG. 2, two rearwardly extending laterally spaced arms 42 and 44 which are fixed to the axle 40. Naturally, sufficient room is provided between the arms 42 and 44 for the placement of the wheel 36 and associated assembly 45. Forwardly of the rear arms 42 and 44 is a rigid transverse frame member 46. This frame member 46 structurally ties the arms 42 and 44 together such that they act as a unit. Forwardly of the rigid transverse frame member 46 are forwardly extending, laterally spaced members 48 and 50. These members extend to define sockets for receipt of pivot mechanisms.

Figure 2:
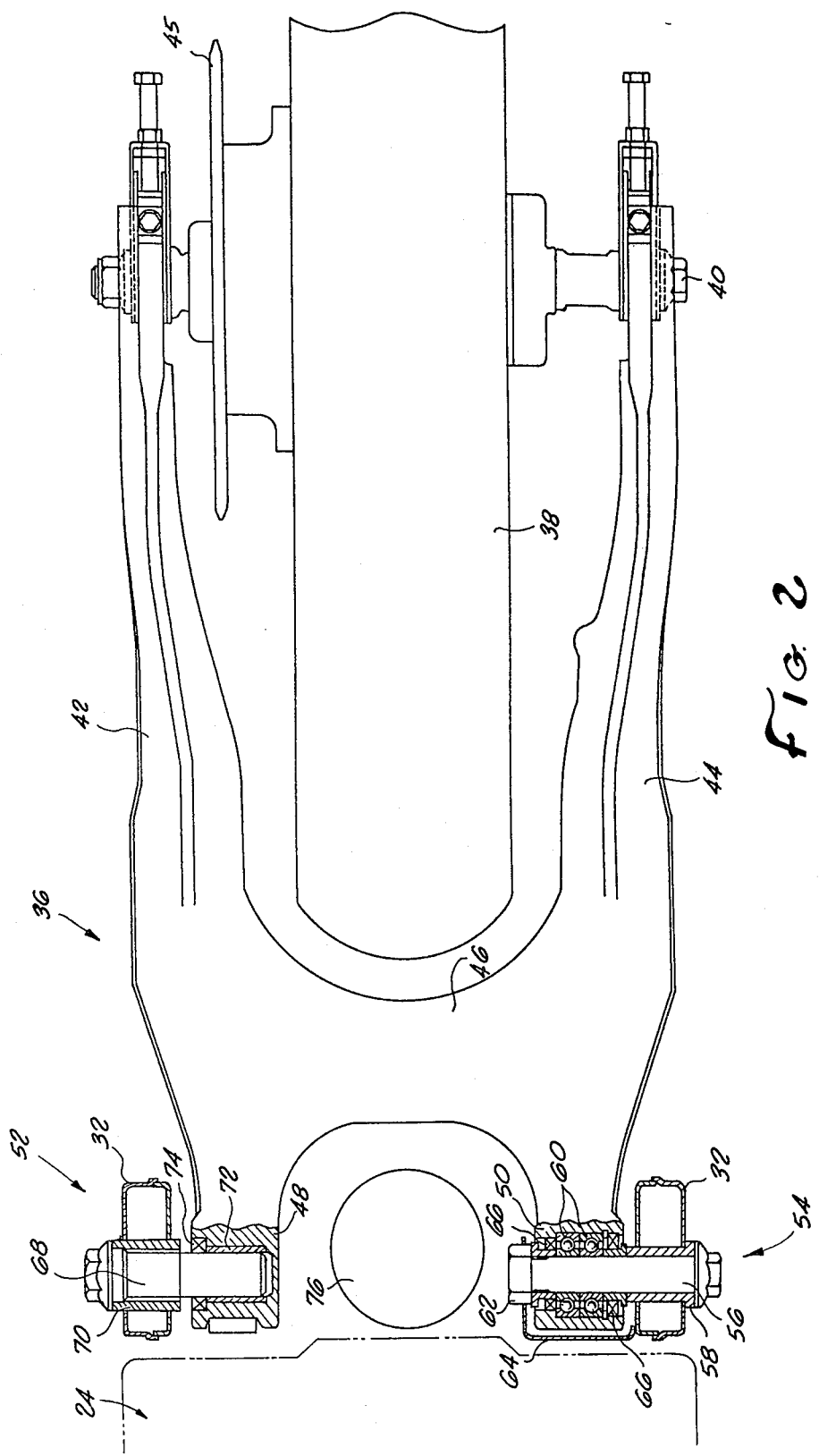
FIG. 2 is a schematic plan view of the layout of the pivot mechanisms and rear fork of a motorcycle embodying the present invention.

Two pivot mechanisms generally designated 52 and 54 are each fixed to a connecting bracket 32 as can best be seen in FIG. 2. The pivot mechanism 54 includes a pivot pin 56 extending through a sleeve 58 within the left side connecting bracket 32 and through pivot bearings 60 set within the socket of the member 50 of the rear fork assembly 36. The pivot pin 56 is secured by means of a nut 62 held within a bracket 64 fixed to the connecting bracket 32. Dust seals 66 protect the bearings from environmental dirt and the like. The bearings 60 provide thrust resistance and thereby maintain the forwardly extending member 50 axially fixed on the pin 56 and therefore axially fixed relative to the connecting bracket 32.

A second pivot pin 68 on the right pivot mechanism 52 is fixed in a sleeve 70 in turn fixed in the right side connecting bracket 32. Positioned within the socket in the forwardly extending member 48 is a pivot slide bearing 72 for receipt of the pivot pin 64. Again a dust seal 74 is employed to protect the bearing. The slide bearing 72 allows axial movement of the pivot pin 68 relative to the forwardly extending member 48. Thus, the right side pivot mechanism 52 is able to accommodate variations in the width of either the frame itself or the rear fork. This necessarily reduces the cost of high tolerance components.

Between the pivot mechanisms 52 and 54 the rear fork mechanism 36 has been structured so as to create a space as can best be seen in FIG. 2. The rearward most portion of the engine 24 is illustrated in phantom to further show definition of this space. Located through this space is a cushion member 76 which, in the preferred embodiment, acts as both a spring and damping mechanism. A bracket 78 is fixed to the backbone frame member 14 and the center frame 18 to receive a first end of the cushion member 76. This first end is pivotally fixed to the bracket 78 at a pin 80. The cushion member 76 extends downwardly in a direction roughly aligned with the second section of the backbone frame member 14 through the space defined between the pivot mechanisms 52 and 54.

The cushion member 76 is connected at its second, lower end to move upwardly with the rear fork 36. In this way, the cushion member is compressed and is able to resiliently resist and damp the motion of the rear fork 36. This coupling of the lower end of the cushion member 76 to the rear fork 36 is accomplished by means of a linkage mechanism, generally designated 82. This linkage mechanism 82 includes a first link 84 which is pivotally mounted at one end to the rear fork 36. This first link 84 extends downwardly and forwardly to a pin 86 coupling the cushion member 76. A second link 88 is pinned to the first link 84 and to a bracket 90 fixed to the transverse frame member 34. By virtue of the links 84 and 88, the stroke of the cushion member 76 has a rate which increases relative to the rising rate of the rear wheel 38 as the wheel moves upwardly. Thus, increased shock absorbing characteristics can be provided by the linkage mechanism 82.

Thus, a structure is defined for a motorcycle which provides for a cushion member between the pivot mechanism supporting a rear fork mechanism. As can best be seen in FIG. 1, the location of the cushion mechanism and its orientation allow the engine and rear wheel to be placed relatively close together. The dual pivot mechanisms also reduce structural and tolerance requirements. While embodiments and applications of this invention have been shown and described, it would be apparent to those skilled in the art that many more modifications are possible without departing from the inventive concepts herein. The invention, therefore, is not to be restricted except in the spirit of the appended claims.

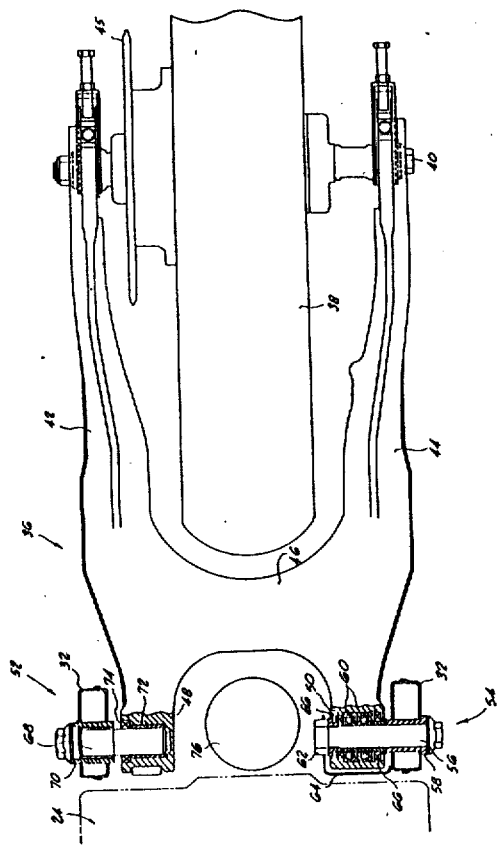

What is claimed is:

1. A rear wheel suspension system for a vehicle having front and rear wheels, a frame and a centrally mounted engine, comprising
   two pivot mechanisms laterally spaced and mounted to the frame;
   a rear fork having two forwardly extending, laterally spaced members mounted to said pivot mechanisms to pivotally mount said rear fork to the frame, each said forwardly extending member including a socket, one of said pivot mechanisms having a first pivot pin fixed to the frame and a first pivot bearing fixed to one of said sockets, said first pivot pin being axially slidable in said first pivot bearing, the other of said pivot mechanisms having a second pivot pin fixed to the frame and a second pivot bearing fixed to one of said sockets, said second pivot pin being axially fixed in said second pivot bearing.

2. The rear wheel suspension system of claim 1 further comprising a cushion member extending between said forwardly extending members, rearwardly of an engine and forwardly of a rear wheel a first end of said cushion member being fixed to the frame and a second end of said cushion member being fixed such that said second end moves upwardly with upward pivotal movement of said rear fork.

3. The rear wheel suspension system of claim 2 wherein said cushion member extends between said pivot mechanisms.

4. The rear suspension system of claim, 2 or 3 wherein said rear fork further has a rigid transverse frame member and two rearwardly extending, laterally spaced members extending to the rear wheel, said two forwardly extending laterally spaced members extending forwardly from said transverse frame member and said cushion member being forwardly of said transverse frame member.

5. A rear wheel suspension system for a vehicle having front and rear wheels, a frame and a centrally mounted engine, comprising two pivot mechanisms laterally spaced and mounted to the frame;

a rear fork having two forwardly extending, laterally spaced members mounted to said pivot mechanisms to pivotally mount said rear fork to the frame, each said forwardly extending member including a socket, one of said pivot mechanisms having a first pivot pin fixed to the frame and a first pivot bearing fixed to one of said sockets, said first pivot pin being axially slidable in said first pivot bearing, the other of said pivot mechanisms having a second pivot pin fixed to the frame and a second pivot bearing fixed to the other of said sockets, said second pivot pin being axially fixed in said second pivot bearing, and linkage mechanism extending from said rear fork rearwardly of said pivot mechanisms to below said two pivot mechanisms; and a cushion member extending between said pivot mechanisms, fixed at a first end to the frame and at a second end to said linkage mechanism.

6. The rear wheel suspension system of claim 5 wherein said rear fork further has a rigid transverse frame member and two rearwardly extending, laterally spaced members extending to the rear wheel, said two forwardly extending laterally spaced members extending forwardly from said transverse frame member.

* * * * *

UNITED STATES PATENT AND TRADEMARK OFFICE
CERTIFICATE OF CORRECTION

PATENT NO. : 4,484,652

DATED : November 27, 1984

INVENTOR(S) : Kouji Shiratsuchi et al.

It is certified that error appears in the above-identified patent and that said Letters Patent is hereby corrected as shown below:

The title page should be deleted to appear as per attached title page.

Signed and Sealed this

Eighteenth Day of June 1985

[SEAL]

Attest:

DONALD J. QUIGG

Attesting Officer     Acting Commissioner of Patents and Trademarks

United States Patent [19]

Shiratsuchi et al.

[11] Patent Number: 4,484,652
[45] Date of Patent: Nov. 27, 1984

[54] SUSPENSION SYSTEM

[75] Inventors: Kouji Shiratsuchi, Saitama; Yoshimi Ishikawa, Tokyo, both of Japan

[73] Assignee: Honda Giken Kogyo Kabushiki Kaisha, Tokyo, Japan

[21] Appl. No.: 412,505

[22] Filed: Aug. 30, 1982

[30] Foreign Application Priority Data

Sep. 4, 1981 [JP] Japan .................. 56-138611
Sep. 4, 1981 [JP] Japan .................. 56-138610

[51] Int. Cl.³ .............................. B62K 25/20
[52] U.S. Cl. .......................... 180/227; 280/284
[58] Field of Search ............ 180/219, 227; 280/284

[56] References Cited

U.S. PATENT DOCUMENTS

| | | | |
|---|---|---|---|
| 4,058,181 | 11/1977 | Buell | 180/227 |
| 4,076,271 | 2/1978 | Doncque | 280/284 |
| 4,360,214 | 11/1982 | Isono | 280/284 |
| 4,415,057 | 11/1983 | Yamaguchi | 180/227 |

FOREIGN PATENT DOCUMENTS 504447  4/1939  United Kingdom ............... 180/227

Primary Examiner—David M. Mitchell
Assistant Examiner—Kenneth R. Rice
Attorney, Agent, or Firm—Lyon & Lyon

[57] ABSTRACT

A motorcycle frame and suspension system employing a backbone frame member extending rearwardly over an engine and then downwardly where it is associated with an inverted U-shaped center frame. Two pivot mechanisms for a rear fork are positioned in line with the ends of the inverted U-shape center frame and a cushion member is located therebetween. The cushion member is linked at its first end with the middle of the center frame and at its second end to a linkage mechanism fixed to move with the upward pivotal motion of the rear fork. The mechanism is so proportioned as to provide an increasing rate of upward motion to the cushion member as the rear fork moves upwardly. The two pivot mechanisms are not identical, one allowing axial sliding movement and the other not allowing such movement.

6 Claims, 3 Drawing Figures